United States Patent [19]
Head

[11] Patent Number: 5,368,421
[45] Date of Patent: Nov. 29, 1994

[54] TOOL HOLDER AND A TOOL THEREFOR

[76] Inventor: Kenneth A. J. Head, 14 Westlecot Road, Swindon-Wiltshire SN1 4HB, England

[21] Appl. No.: 288,040

[22] PCT Filed: Jun. 16, 1987

[86] PCT No.: PCT/GB87/00419

§ 371 Date: Dec. 19, 1988

§ 102(e) Date: Dec. 19, 1988

[87] PCT Pub. No.: WO87/07548

PCT Pub. Date: Dec. 17, 1987

[30] Foreign Application Priority Data

Jun. 16, 1986 [GB] United Kingdom ............. 8614579

[51] Int. Cl.⁵ ............. B23B 31/165; B23B 31/173; B23B 51/00
[52] U.S. Cl. ............. 408/240; 279/42; 279/46.7; 279/48; 279/155; 408/226
[58] Field of Search ............. 279/87, 8, 56, 47, 55, 279/28, 1 F, 46 R, 7, 49 52, 54, 69, 70, 102, 103, 1 E, 48, 1 Q, 51, 50, 42, 155, 43.7, 46.7; 408/232, 239 R, 238, 239 A, 240, 226; 409/234, 232

[56] References Cited

U.S. PATENT DOCUMENTS

| | | | |
|---|---|---|---|
| 461,617 | 10/1891 | Peck | 279/56 X |
| 1,603,531 | 10/1926 | Flaherty | 279/1 E |
| 1,788,268 | 1/1931 | Anderson | 279/1 E |
| 2,359,286 | 10/1944 | Billger | 409/234 X |
| 2,415,482 | 2/1947 | Greenough | 279/1 E |
| 2,432,350 | 12/1947 | Stoner . | |
| 2,491,605 | 12/1949 | Chittenden | 279/82 |
| 2,552,732 | 5/1953 | Plante . | |
| 2,705,641 | 4/1955 | Simpson | 279/41 |
| 2,746,758 | 5/1956 | Stoner et al. | 279/1 Q |
| 2,785,903 | 3/1957 | Lassey . | |
| 2,940,765 | 6/1960 | Appleby . | |
| 3,643,969 | 2/1972 | Finley et al. | 279/4 |
| 3,788,658 | 1/1974 | Benjamin et al. | 279/1 B |
| 3,850,054 | 11/1974 | Weissman | 408/226 |
| 3,905,609 | 9/1975 | Sussman | 279/56 |
| 4,632,611 | 12/1986 | Burns | 408/232 X |

FOREIGN PATENT DOCUMENTS

| | | | |
|---|---|---|---|
| 294504 | 10/1965 | Australia | 409/234 |
| 480183 | 1/1952 | Canada | 279/48 |
| 2556255 | 12/1984 | France . | |
| 82 | of 1910 | United Kingdom . | |

*Primary Examiner*—Daniel W. Howell

[57] ABSTRACT

The tool holder is arranged to receive a tapered tool shank. The collet has a shank engaging surface which, in use, lies substantially on the surface of a notional cone which tapers in the direction of withdrawal of the shank from the tool holder.

1 Claim, 4 Drawing Sheets

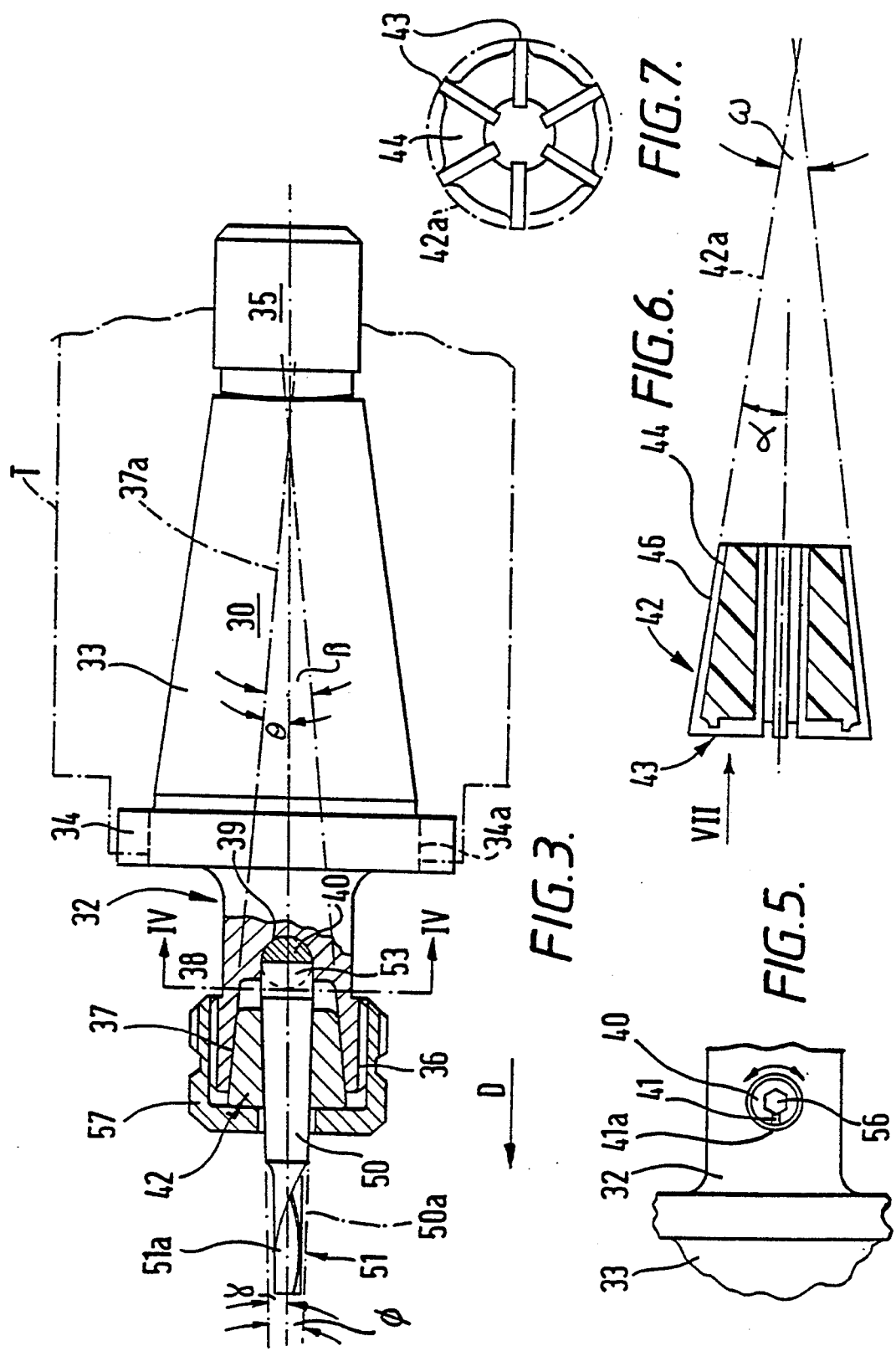

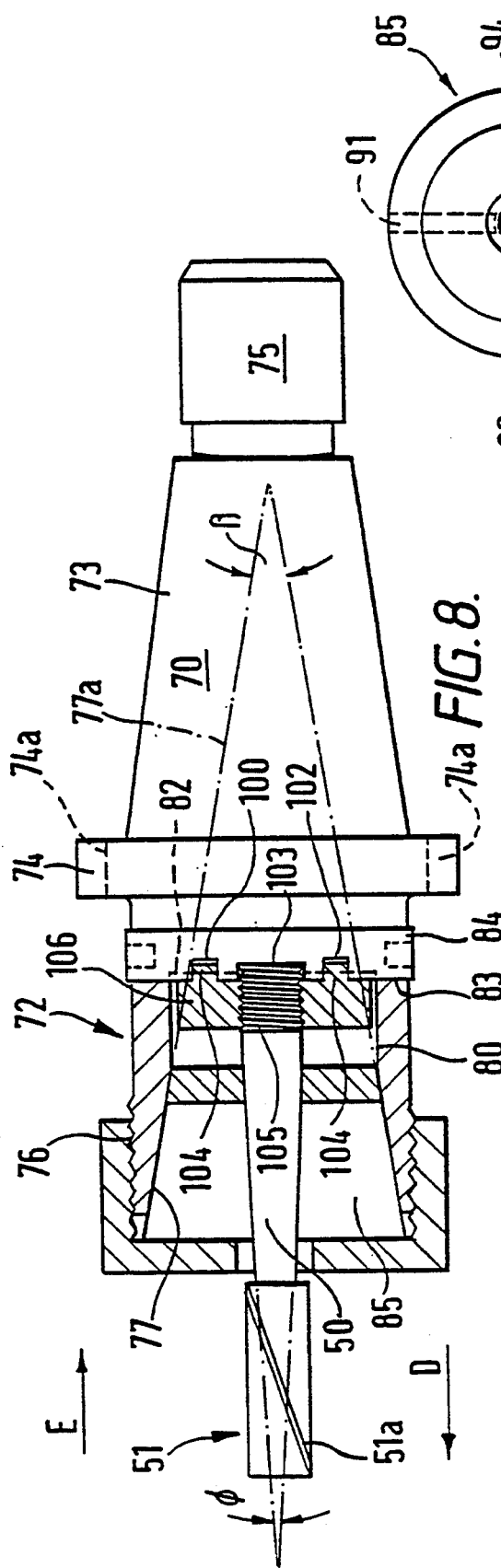
*FIG.8.*
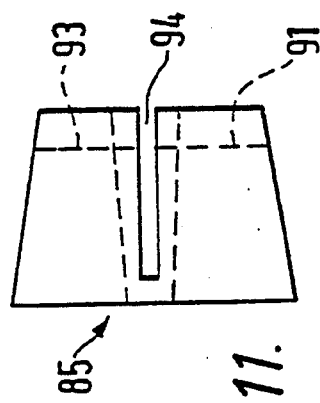
*FIG.10.*
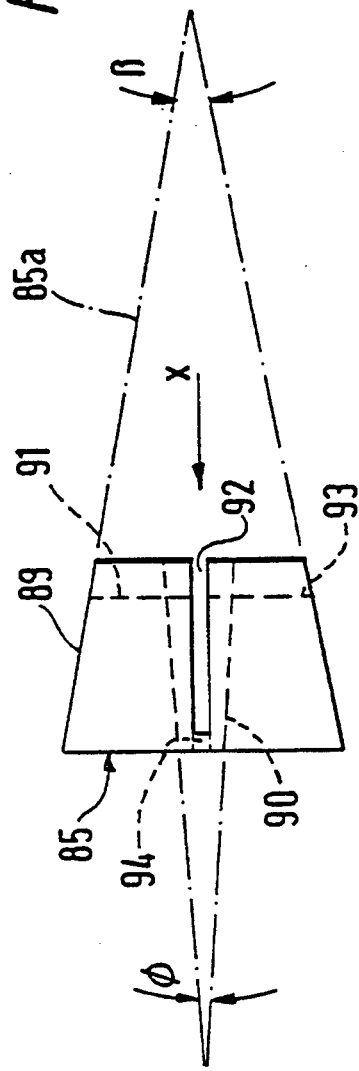
*FIG.11.*
*FIG.9.*

TOOL HOLDER AND A TOOL THEREFOR

The invention relates to a tool holder and a tool therefor and is particularly but not exclusively concerned with a tool holder suitable for mounting on a spindle of a milling machine or CNC machinery centre or a tool holder in the form of a chuck e.g. for a drilling machine, machine tool turret, lathe tailstock or portable drill.

Known types of tool holders for use with milling machine and CNC machines are shown partly in cross-section FIGS. 1 and 2 of the accompanying drawings.

In FIG. 1 a body 10 has a taper shank 11 for location in a spindle (not shown) of the machine. The body 10 is formed with a blind bore 12 coaxial with the taper shank 11 and external screw threading 13. The blind end of the bore 12 is provided with a centre 14 and locating depressions 15 for anti-rotations projections 16 on a cylindrical nut 17. The nut is a close sliding fit in the bore 12. The bore 12 houses a sleeve 18 which is a close sliding fit in the bore. The sleeve has an internal tapered surface 19 which engages an external tapered surface 9 on a collet 20. The collet comprises a sleeve formed with slits 21 in known manner extending from the left hand end as shown and which terminate short of the opposite end. A clamping nut or nose cap 22 screws on to the thread 13. This type of tool holder is used to hold a tool 23 having a straight shank 24 and a screw threaded right hand end 25. The end 25 (which has a right hand screw thread) screws into the nut 17 and torque applied to the nose cap 22 urges the surface 9 of collet 20 against surface 19 of the sleeve 18 so that the collet contracts to grip the shank 24. Rotation and axial withdrawal of the tool is resisted by the combined effect of the collet 20 and nut 17. However, if rotational forces on the tool are sufficient to overcome the frictional grip of the collet, and if the rotational direction of the spindle is of opposite hand to that of the threaded section 25, it is possible for the tool to unscrew from the nut 17 and this can prove to be a problem. Another problem which arises is that the tolerance between the sleeve 18 and bore 12 can sometimes be such as to permit a small degree of radial movement of the sleeve in the bore. In certain cases this can lead to 'chattering' of the tool, impairing the finish on a workpiece and resulting in inaccuracies.

FIG. 2 shows an alternative type of tool holder where the nut 17 is dispensed with and the threaded section 25 of the shank screws directly into the collet 20. In this case, the nose cap 22 engages the sleeve 18 to contact the collet. It will be appreciated that the problems outlined above are not overcome by the FIG. 2 tool holder.

If the tool should rotate during use as described above it would also shift axially due to the screw thread on the shank 24 and any setting which had been carefully selected by the machine setter beforehand would alter. Such axial shifting would clearly be disadvantageous as it would then be necessary to interrupt production and reset the tool.

One object of the present invention is to provide a tool holder which substantially avoids the foregoing problems.

According to one aspect of the invention there is provided a tool holder for receiving a tool shank having a tapered surface and which comprises a body, shank retaining means on the body and means for causing the shank retaining means to grip the shank, said shank retaining means including shank engaging surface means which, in use, lie substantially on the surface of a notional cone which tapers in the direction of withdrawal of the shank from the tool holder.

According to a further aspect of the invention there is provided a tool holder retaining a tool shank having a tapered surface, the tool holder comprising a body, shank retaining means on the body and means causing the shank retaining means to grip the shank, the tapered surface of the shank tapering towards a working surface of the tool.

Retention of the shank by its tapered surface assists considerably in overcoming the foregoing problems.

The body may be formed with a recess which houses the shank retaining means.

According to another aspect of the invention, there is provided a tool holder comprising a body formed with a recess which receives a shank having a tapered surface e.g. a tool shank, shank retaining means in the recess and clamping means on the body which transmits load to a surface of the recess and to said tapered surface of the shank through the retaining means to retain the shank in the recess, the tapered surface of the shank converging in the direction in which the shank is withdrawn from the holder or converging towards a working section of the tool.

Preferably, the recess has a tapered surface which tapers in a direction opposite to that of the taper on the shank.

The recess may have a surface which lies substantially on the surface of a notional cone which tapers in the opposite direction to that of the taper of the first said notional cone or the taper on the shank.

The shank retaining means may have a first surface engageable with a surface of the recess and a second surface engageable with the shank.

The outer surface of the shank retaining means may have an angle of taper different from that of the recess. That may be achieved by providing the first surface of the shank retaining means so that it lies substantially on the surface of a notional cone having a cone angle different from the cone angle of a notional cone on which a surface of the recess lies.

In one embodiment the surface of the shank retaining means engageable with the shank lies on an imaginary cylinder when free from shank retaining load but on said imaginary cone when under load.

In another embodiment the first surface of the shank retaining means lies substantially on the surface of a notional cone and the second surface lies substantially on the surface of a second notional cone, said notional cones tapering in opposite directions.

The shank retaining means may comprise a plurality of spaced segments which may be held together by resilient means such as rubber. Alternatively the shank retaining means may comprise a collet made e.g. from metal or other suitable material and formed with axial slitting. A slit may extend the full axial length of such a collet.

Ejector means may be provided for the shank. The ejector means may comprise a rotatable member having a surface which urges the shank axially in the withdrawal direction from the holder on rotation of the member from a first position to a second position. The surface may be formed by a slot in the member which receives a tail portion of the shank. The slot preferably resists rotational movement of the shank.

The rotatable member may be a pin held in the body, e.g. by retaining rings which can be press fitted into the body.

Second retaining means may be provided which threadedly engages the shank whereby unscrewing of the shank from the second retaining means tends to increase the shank gripping effect of the first said shank retaining means. The unscrewing effect preferably causes the tapered shank to be forced in a wedge fashion against the first retainer means to increase the gripping effect.

In a further embodiment, the shank retaining means may comprise a plurality of jaw elements mounted for movement in a chuck body. The jaw elements may be moved along axes inclined to the axis of chuck by screw means. The jaw elements may be arranged so as to be self centering.

Preferably the shank retaining means, in use, holds the shank coaxial with an axis of the tool holder.

The invention also includes a tool having a shank tapered towards a working section of the tool and for use with a tool holder in accordance with any of the seventeen immediately preceding paragraphs.

The shank may taper in the direction in which the tool is withdrawn from tool.

The means for causing the shank retaining means to grip the shank may comprise a screw-threaded collar which engages a screw thread on the body.

Tool holders and tools in accordance with the invention will now be described by way of example with reference to the further accompanying drawings in which:

BRIEF DESCRIPTION OF THE DRAWINGS

FIG. 3 is a partial cross-section through a tool holder in accordance with the invention;

FIG. 5 is a view on arrow B in FIG. 4;

FIG. 6 is a cross-section through part of a collet of the tool holder of FIG. 3;

FIG. 7 is an end view of the collet of FIG. 6 looking in the direction of arrow VII in FIG. 6;

FIG. 8 is a partial cross-section through another embodiment of tool holder in accordance with the invention;

FIG. 9 is an elevation of a collet for use with the tool holder of FIG. 8;

FIG. 10 is an end view of the collet of FIG. 9 looking in the direction of arrow X in FIG. 9;

FIG. 11 is an elevation of an alternative collet for use with the tool holder of FIG. 8;

In FIG. 3 a body 30 comprises a nose 32, a taper shank 33 and an intermediate flange 34 which is formed with standard location notches 34a. In the embodiment illustrated, the right hand end of the shank 33 is formed with an external screw thread 35 for use in retaining the body in a spindle or turret T.

Figure 1:
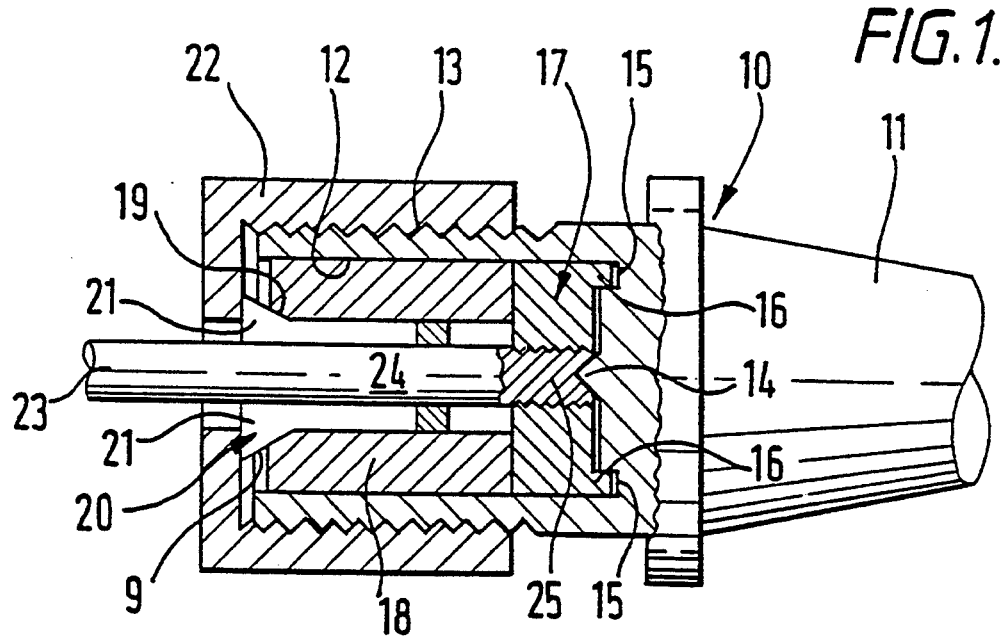
FIG. 1 shows a prior art chuck.

The nose 32 is formed with an external screw thread 36 and an internal frusto conical bore 37 which tapers towards the right as viewed in FIG. 3 and terminates at an end face 38. The nose is also formed with a transverse bore 39 which opens out at the face 38 so as to form a groove in the face and which receives an ejector pin 40 described below.

The bore 37 houses a collet 42 comprising a plurality of wedge shaped segments 43 (FIG. 6) interconnected by flexible webs 44. Such collets are commonly known as rubber bonded collets. In the unstressed state of the collet, inner edges 45 of the segments lie on an imaginary cylinder. FIG. 6 shows the outer edge of the segment 43 inclined to the collet axis at an angle $\alpha$ (e.g. 11°) when the collet is unstressed. The outer edges of the segments then lie on the surface of a notional cone 42a having a cone angle $\omega$ of 22°. The wall of the bore 37 is inclined to the axis of the bore 37 at an angle $\theta$ (e.g. 10½°). The wall of bore 37, therefore, lies on the surface of a further notional cone 37a, having a cone angle $\beta$ of 21° i.e. one degree less than angle $\omega$.

A shank 50 of a tool 51 slides into the collet and is tapered in the opposite direction to the tapered bore 37 i.e. the shank converges towards the working end or working section 51a of the tool. Such a working section can be a cutting edge such as would be used on a drill or milling cutter. Alternatively, the working section could be an abrading surface or a support surface for a separate cutter mounted thereon, e.g. for boring. The shank tapers in the tool withdrawal direction D in the embodiments shown. The surface of the shank 50 is inclined at an angle $\gamma$ to its axis e.g. ½° and lies on a notional cone 50 having, in this case a cone angle $\phi$ of 1° which is the difference between the angles $\beta$ and $\omega$.

Figure 4:
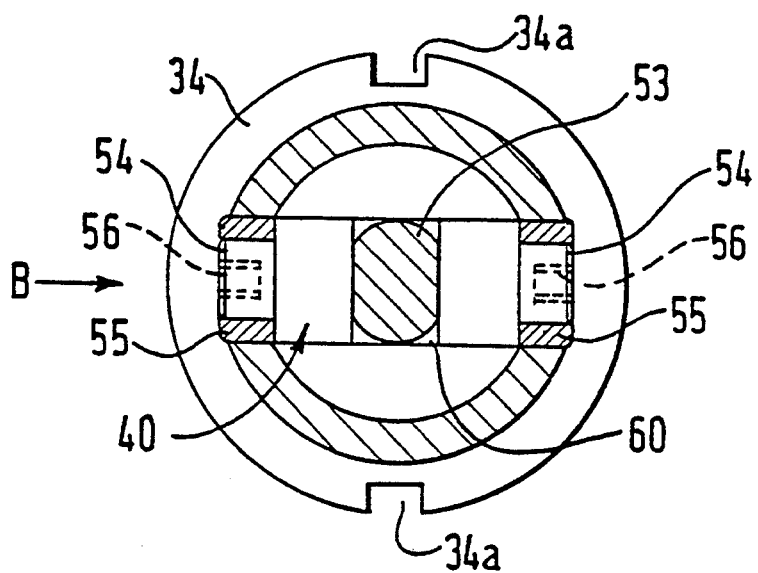
FIG. 4 is a cross-section of the tool holder in FIG. 3 on line IV—IV in FIG. 3.

The tail end of shank 50 of the tool 51 is formed with a tang which co-operates with the ejector pin 40. The pin is rotatably mounted in bore 39 and is formed with two reduced diameter end sections 54. The pin 40 is retained in the bore 39 by two rings 55 (shown in cross-section in FIG. 4) which press fit into the bore 39 but leave the pin 40 free to rotate. The pin is formed with a cut-out or slot 60 which receives the tang 53 to inhibit rotation of the tool shank. The pin is formed with hexagonal sockets 56 at its ends which enables the pin to be rotated by a socket spanner. The ends of the pin and the adjacent ring may carry marks 41, 41a (FIG. 5) respectively which align when the pin occupies the position shown in FIGS. 3 and 4. It is envisaged that frictional grip of the collet 42 alone may be sufficient to prevent rotation of the shank so that the tang 53 may be omitted.

A nut or nose cap 57 screws on to the threaded nose 32 and pushes the collet 42 to the right so that the edges 46 of the segments abut the wall of the bore 37.

Figure 2:
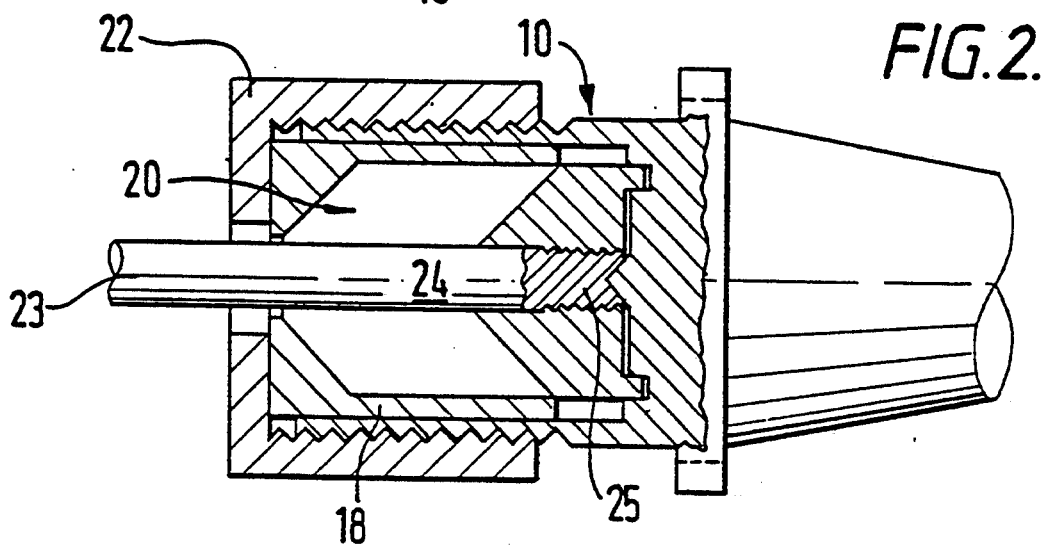
FIG. 2 shows a prior art chuck.

The resilient webs 44 permit the elements to tilt from their unstressed positions so that the edges 46 lie against the bore 37. On so doing the inner edge 45 of each segment becomes inclined to the collet axis by ½° to correspond to angle $\phi$ of the shank 50. The nut 57 is tightened sufficiently to cause the collet to contract whereby the segments apply loading to the bore 37 and the shank 50 to hold the shank frictionally in the nose 32. The tool is then prevented from rotating in either direction both by the tang 53 and cut-out 60 and by the frictional retention. Contraction of the collet 42 tends to urge the tang 53 against the bottom of the cut-out 60. Moreover, any withdrawal force on the tool in direction D will be resisted by the taper engagement between the shank 50 and collet 42. In fact, the greater the load on the tool in direction D, the greater becomes the gripping load on the tool. Moreover, the load of the collet 42 against the bore 37 eliminates working tolerance which leads to chattering in the prior tool holders in FIGS. 1 and 2.

When it is desired to remove the tool, the nut 57 is unscrewed to relieve the loading on the collet and the ejector pin 40 is rotated so that the bottom of cut-out 60 acts as a cam against the tang 53 to urge the shank 50 in direction D. The tool can then be withdrawn by hand.

Instead of using a rubber bonded type of collet, a flexible steel type can be used as shown in FIGS. 8 to 11.

In FIG. 8 a body 70 comprises a nose 72, a taper shank 73 and an intermediate flange 74 which is formed with notches 74a. The right hand end of the shank 73 is formed with an external screw thread 75 as in FIG. 3 for use in retaining the body in a spindle or turret.

The nose 72 is formed with an external screw thread 76 and an internal frusto-conical bore 77 which tapers towards the right as viewed in FIG. 8. The bore 77 terminates at a cylindrical counterbore 80 which itself terminates on a blind end face 82. The nose 72 is also formed with a transverse bore 83 which opens out at the face 82 so as to form a groove in the face. The bore 83 receives an ejector pin 84 described below.

The bore 77 houses a collet 85 comprising a steel sleeve formed with a tapered external surface 89, a tapered internal bore 90 (which tapers in the opposite direction to the tapered external surface 89) and a plurality of slits e.g. four in number 91, 92, 93, 94. Slits 91, 93 extend axially of the sleeve from the left hand end as viewed in FIGS. 8 and 9 and terminate short of the right hand end of the sleeve, the slit 92 extends from the right hand end of the sleeve terminating short of the left hand end and the slit 94 extends for the full length of the sleeve.

The configuration of the bore 77 is similar to that of the bore 37 in FIG. 3 and lies on a notional cone 77a having a cone angle $\beta$.

The outer surface of the collet 85 lies on notional cone 85a having the same cone angle $\beta$ and the internal bore lies on a notional cone 85b having the same cone angle $\phi$ as that of the shank 50 of the tool 51.

The end face 82 and/or ejector pin 84 are formed with sockets 100, 102, 103. The sockets 100 and 102 receive anti-rotation projections 104 on an internal nut 106 and the socket 103 receives with working clearance a screw-threaded end 105 of the shank 50 screwed into the internal nut 106.

Threading on the internal nut and the shank is preferably left-handed.

The collet can be loaded axially by a nut 107 which screws on to the threaded exterior 76 of the body as in FIG. 3.

To assemble the tool holder, the internal nut 106 is placed in the holder so that its projections 104 locate in the sockets 100, 102. The collet 85 is then placed in position and the nut 106 screwed on to the body. The tool shank 50 is then inserted through the internal bore 90 of the collet 85 and is screwed into the internal nut 106 until it bottoms in the socket 103. The nut 107 is then tightened so that the external surface 89 of the collet 85 engages the wall of bore 77 thereby causing the tapered internal bore 90 of collet 85 to contract and grip the tapered shank 50.

If a cutting torque were applied to the tool 51 so as to tend to rotate it clockwise when viewed in direction E in FIG. 8, any slippage of the shank within the collet would cause the left-hand threading on the shank and internal nut to urge the shank in direction D therefore wedging it further into the collet and increasing the frictional grip. If any particular tool cuts by application of an opposite torque, the threading on the internal nut 106 and the shank could be right-handed. In both cases the internal nut would react against the right-hand end 82 of the bore 77. If the rubber bonded collet of FIGS. 3-7 were used in the FIG. 8 embodiment instead of collet 85, a similar wedging action of the tool shank against the inner edges of the segments 43 would occur.

In the embodiments of FIGS. 3 and 8, the angle of taper or cone angle $\beta$ and $\phi$ can be less than 10° so that the interengaging tapered surfaces on the nose, collet and shank are "self locking" due to friction between the tapered surfaces after the fashion of a Morse taper shank. The ejector pin 84 can then be turned to "break" the frictional grip so that the tool can be removed.

FIG. 11 shows an alternative collet having its slits designated with the same reference numerals used in FIGS. 9 and 10. In FIG. 11 the slitting is the same as in FIGS. 9 and 10 except that slit 94 does not extend through the length of the entire collet.

Figure 12:
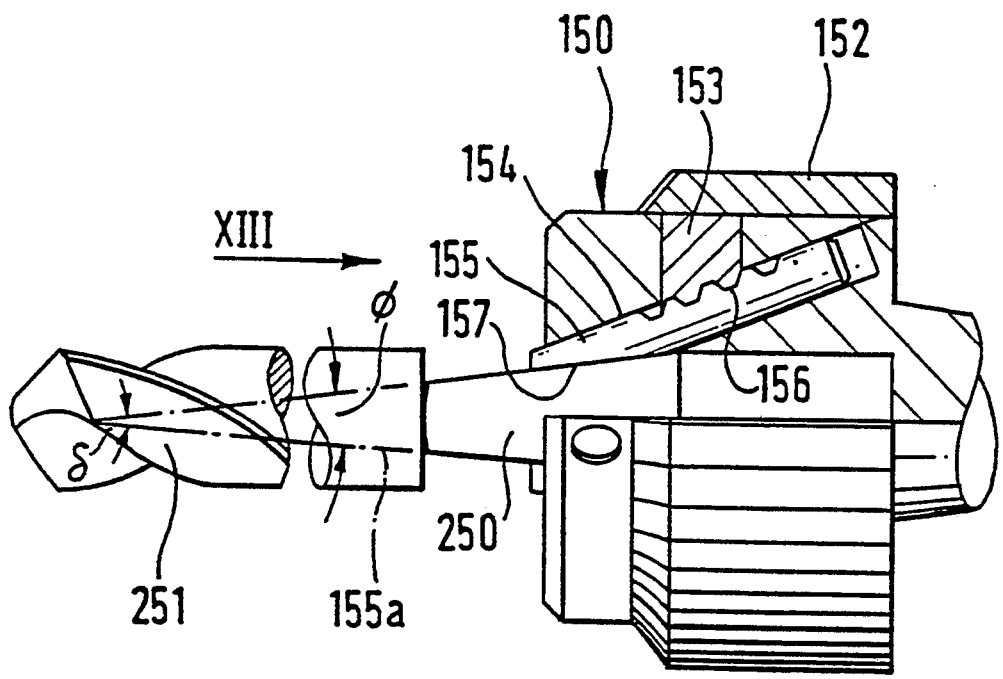
FIG. 12 is a partial cross-section through a further embodiment of tool holder in accordance with the invention.
Figure 13:
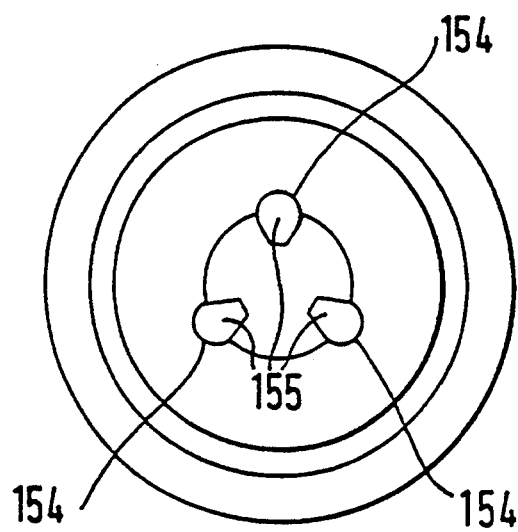
FIG. 13 is an end view of the tool holder of FIG. 12 with the tool omitted looking in the direction of arrow XIII in FIG. 12.

A third embodiment is shown in FIGS. 12 and 13. A chuck body 150 of a type used commonly in three jaw self centering chuck has the usual rotatable sleeve 152 therein drivably connected to an internally screw-threaded ring 153. The body 150 is formed with three equi-spaced and inclined bores 154 which slidably house respective jaws 155. The jaws have external grooving 156 which mate with the screw threaded ring 153. Each jaw has an internal shank gripping surface 157 arranged so that the surfaces of the jaws lie on the surface of a notional cone 155a. The cone angle $\delta$ of the cone 155a corresponds to the cone angle $\phi$ of the shank 50 of a drill 251. Rotation of the sleeve 152 and ring 153 can be effected by a chuck key locatable in a socket 158 in the body in known manner. Such rotation causes the jaws 155 to move in the bores 154 to grip or release the shank 50. Once the shank is gripped, the taper on the shank and the inclination of surfaces 157 prevent withdrawal of the tool from the chuck in direction D.

The arrangement of FIGS. 12 and 13 may be used on electric drills suitable for D.I.Y. use.

Tapers such as the taper of the tool shank at angle $\phi$ are shown exaggerated for purposes of illustration only.

Where reference herein has been made to "a shank", such reference includes not only the shank of a tool but to any sleeve or other intermediate tool holding shank-like element which in use receives a tool shank and which may effectively increase the tool shank diameter.

Where collets are used, it is envisaged that the collet can comprise segments held together by resilient clips.

It will be apparent that the tool holder of the invention may be used in conjunction with capstan/turret and single spindle and multispindle lathes by suitable adaptation of the shank of the tool holder to fit the tool holding means of such machines.

Whilst reference has been made to particular values for various angles, other suitable values for those angles could be selected.

What is claimed is:

1. A combination of a Tool Holder and Cutting Tool, the Tool Holder comprising a body having a frustum conical bore with its wide end opening at a forward end of said body and its narrow end closed in the body, a rearward end of the body having a tapered shank, the body having at its said forward end an external threaded portion coaxial with said frustum conical bore and located radially outward of said frustum conical bore, said body rotationally receiving an ejector pin in a bore extending transversely to a longitudinal axis defined by said frustum conical bore and being adjacent to said closed end of said frustum conical bore, said ejector pin having a cut-out slot therein extending transversely to a longitudinal axis defined by said ejector pin, a nosecap having internal threads threadable on said external threaded portion of said body and having a shoulder extending in a direction radially inward from said internal threads, a flexible collet having a plurality of circumferentially spaced wedge shaped gripping segments having rubber interposed between adjacent segments, when said collet is unstressed said segments having radially outward surfaces coincident with a notional cone of an angle greater than the angle of said frustum conical bore and radially inward surfaces equally spaced from and parallel to a longitudinal axis defined by said collet; the cutting tool having a cutting portion to an axially forward end thereof and a tang at an axially rearward end thereof receivable in said cut-out slot in said ejector pin and a frustum conical shank portion intermediate between said cutting portion and said tang, the large diameter of said frustum conical shank portion being axially rearward to the small diameter of that portion; whereby when said collet is fitted in said frustum conical bore with the small diameter portion of the outer surfaces defined by said notional cone being adjacent to the closed end of said frustum conical bore and said nose cap threaded on said external threaded portion of said body and said cutting tool inserted into the internal bore defined by said collet said nose cap can be tightened to axially displace said collet by way of engagement of said collet and said nose cap shoulder to cause said internal bore defined by said collet to contract and conform to the frustum conical tool shank portion and urge said tang to bottom out in said cut-out slot in said ejector pin thereby preventing relative rotation between said tool holder and said cutting tool.

* * * * *